(12) United States Patent
Chablat et al.

(10) Patent No.: US 7,997,161 B2
(45) Date of Patent: Aug. 16, 2011

(54) DEVICE FOR THE MOVEMENT AND ORIENTATION OF AN OBJECT IN SPACE AND USE THEREOF IN RAPID MACHINING

(75) Inventors: Damien Chablat, Nantes (FR); Philippe Wenger, Sainte Luce sur Loire (FR)

(73) Assignees: Centre National de la Recherche Scientifique (C.N.R.S.), Paris (FR); Ecole Centrale de Nantes, Nantes (FR)

( * ) Notice: Subject to any disclaimer, the term of this patent is extended or adjusted under 35 U.S.C. 154(b) by 1070 days.

(21) Appl. No.: 10/544,464

(22) PCT Filed: Feb. 4, 2004

(86) PCT No.: PCT/FR2004/000259
§ 371 (c)(1),
(2), (4) Date: Jun. 27, 2006

(87) PCT Pub. No.: WO2004/071705
PCT Pub. Date: Aug. 26, 2004

(65) Prior Publication Data
US 2007/0062321 A1   Mar. 22, 2007

(30) Foreign Application Priority Data
Feb. 5, 2003 (FR) .................................... 03 01350

(51) Int. Cl.
  *B25J 17/00* (2006.01)
  *B25J 17/02* (2006.01)
  *B25J 18/00* (2006.01)
  *G05G 11/00* (2006.01)

(52) U.S. Cl. ................ 74/490.03; 74/480 R; 74/490.01; 74/490.06; 901/15; 901/23

(58) Field of Classification Search ............... 74/490.01, 74/490.03, 490.02, 490.05, 490.06, 490.07, 74/490.08, 490.09; 901/23, 14, 15, 27, 28, 901/29
See application file for complete search history.

(56) References Cited

U.S. PATENT DOCUMENTS
3,478,436 A   11/1969 Barnes
4,752,160 A    6/1988 Murray et al.
5,587,937 A   12/1996 Massie et al.
(Continued)

FOREIGN PATENT DOCUMENTS
DE          199 55 520      5/2001
(Continued)

*Primary Examiner* — Thomas R Hannon
*Assistant Examiner* — Alan B Waits
(74) *Attorney, Agent, or Firm* — Young & Thompson

(57) ABSTRACT

The invention relates to a device which is used to move and orient an object in space and to the use thereof in rapid machining. The inventive device (1) comprises an object support which is borne by an intermediary mobile support (13) which is connected to a fixed frame (2) using articulated connecting means (7a, 7b, 7c). The invention also comprises means for moving the aforementioned intermediary mobile support (13) in relation to the fixed frame (2), which maintain the orientation of said intermediary mobile support (13) in relation to the fixed frame (2). The invention further comprises a mechanism (14) which is used to orient the object support in relation to the intermediary mobile support (13). The above-mentioned means for moving the intermediary mobile support (13) comprise actuators (5a, 5b, 5c) which are used to move an end part of each of the articulated connecting means (7a, 7b, 7c) borne by the fixed frame (2) translationally.

11 Claims, 6 Drawing Sheets

U.S. PATENT DOCUMENTS

| | | | |
|---|---|---|---|
| 5,656,905 A | 8/1997 | Tsai | |
| 5,893,296 A * | 4/1999 | Rosheim | 74/490.03 |
| 5,966,991 A | 10/1999 | Gosselin et al. | |
| 5,979,264 A * | 11/1999 | Rosheim | 74/490.06 |
| 6,497,548 B1 | 12/2002 | Roy et al. | |

FOREIGN PATENT DOCUMENTS

| | | |
|---|---|---|
| FR | 2 757 530 | 6/1998 |
| FR | 2 779 080 | 12/1999 |
| WO | WO 02/49811 | 6/2002 |
| WO | WO 02/085580 | 10/2002 |

* cited by examiner

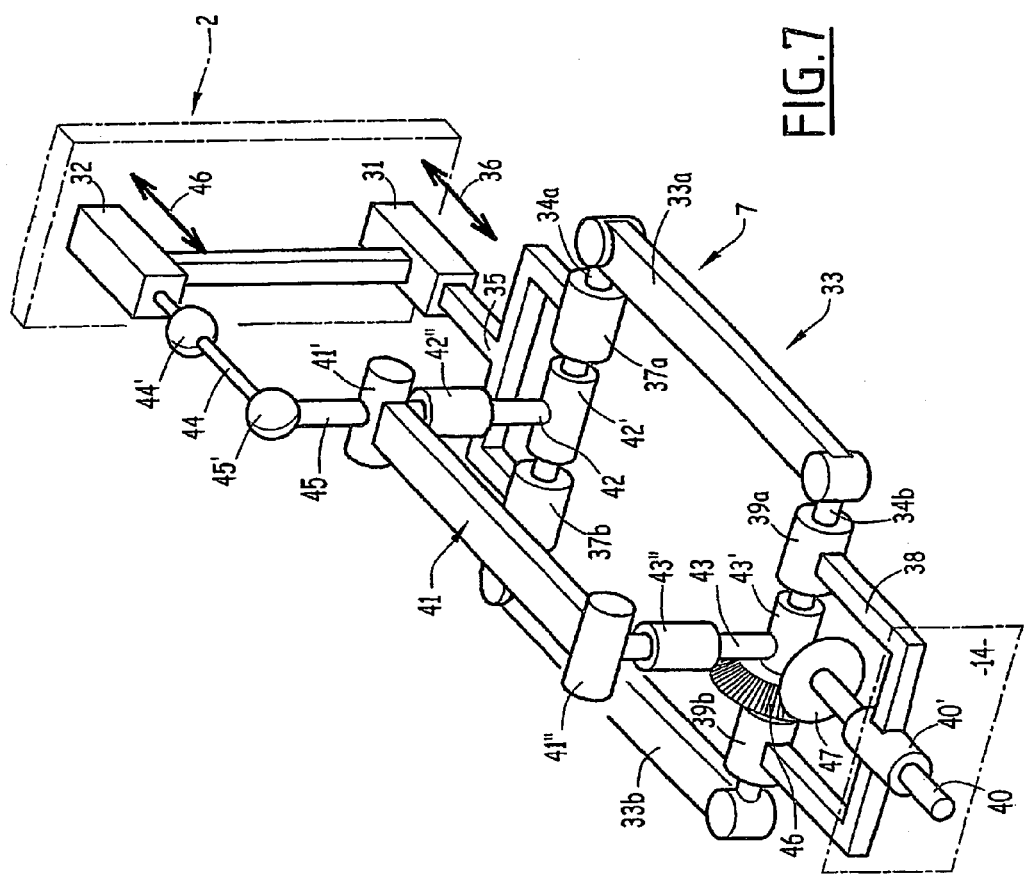

DEVICE FOR THE MOVEMENT AND ORIENTATION OF AN OBJECT IN SPACE AND USE THEREOF IN RAPID MACHINING

FIELD OF THE INVENTION

The invention relates to a device for the movement and orientation of an object in space having at least two degrees of freedom in translation and at least two degrees of freedom in rotation and of parallel type.

BACKGROUND OF THE INVENTION

There are used devices for movement and orientation of objects in space, for example to carry out high precision machining and/or high speed machining. The object whose movement and orientation is ensured, can be constituted by a tool or else by a piece on which machining is performed.

In particular, there should be in certain industries machine tools such as milling tools to carry out high speed machining whose movement can be carried out, for example on five axes of which three axes of movement in translation and two are axes of movement in rotation.

More generally, in the case of machines for machining of complex shape or systems of manipulation of objects with high precision, it may be necessary to use devices for movement comprising at least two axes of movement in translation and two axes of movement in rotation.

Until now, such devices and in particular milling tools with digital control used in industry used a construction of serial type, which is to say a construction in which the axes of movement and the corresponding motor means are mounted in series. There exist several families of devices or machines that can be classified according to their number of degrees of freedom. The most common machines are machines with three, four or five axes, which is to say with three, four or five degrees of freedom. Such machines using constructions of the serial type are less adapted to the needs of high speed machining, because of their high inertia, an upstream axle of the machine having to support a downstream axle and its motor means.

For this type of use, it is thus desirable to use constructions of the parallel type, which is to say comprising motor means carried by a fixed frame of the machine, with a non-driven transmission of the movements of the different portions of the device.

Until now, machine tools of the parallel type with at least five degrees of freedom of movement of a tool or of a workpiece use principally an architecture of the "Gough-Stewart" type, these machines being called hexapodes machines. Such hexapodes machines have a direct geometric design which has up to forty solutions and whose frontiers as well as the position of the singular configurations are difficult to characterize. Small variations of parameters of design can lead to important modifications as to the stability of the direct geometric model and performances of such machines. Moreover, the faculties of orientation of the hexapodes machines are very limited. In the case of a machine tool such as a milling tool with five axes, a hexapode machine requires the management of the redundancy because of the fact that it has six degrees of freedom.

There is also known a hybrid device with five degrees of freedom comprising a carrier of the parallel type and a spherical joint of the serial type. These actuators of the carrier are not fixed and the movement produced by these actuators is not a simple movement of translation. There exist twenty-four solutions to the direct geometric model of this device and there exist no unitary domain in the working space. To maintain the spindle with a constant orientation, it is necessary to change the orientation of the spherical joint. Moreover, the carrier must support the weight of the joint and of its motors.

In the field of high speed machining, for example for the production of milling tools, it is thus desirable to use devices for movement and orientation of tools, of the parallel type, which have a simple geometric and kinematic design as well as a working space of regular and perfectly defined frontiers. It is necessary also that the kinetostatic properties of the device be near those of a conventional machine tool, and to do this, that the device have an isotropic configuration in its working space, with control of the position and of orientation. Moreover, the factors of amplification of the speed of the device must remain limited to all the accessible working space.

There is known a device for movement in space of an object along three axes in translation, which comprises three legs in the form of parallelograms mounted in an articulated manner at a first end, each on a movable element moved by means in translation, carried by a fixed frame, along a slideway carried by the fixed frame and at a second end, on a support of the object to be moved. Such a device does not permit carrying out orientation of the object according to at least two axes, by control from the fixed frame.

There is also known from U.S. Pat. No. 5,966,991 an orientation device of the spherical joint type which comprises two actuators for driving in rotation along two axes on which are mounted first ends of two arms whose second ends are mounted in articulation, for the one, on the support of the object, and, for the other, on an intermediate arm itself mounted articulatedly on the object support.

All the axes of articulation and for driving in rotation of the device are concurrent at a center of spherical rotation of the device. For its actuation, such an orientation device requires the use of actuators in rotation along the axes of which are fixed the arms of the spherical orientation device. These devices for movement in space and orientation, known in the art, are not made in a way enabling them to be associated to constitute a system of movement and orientation of the parallel type.

WO 02/85580 discloses a device for moving a tool of the parallel type. These movements in translation of the tool are transmitted by articulated legs and movements of rotation are transmitted to the tool by axles mounted in the longitudinal direction of the legs.

However, the device does not comprise a mechanism for orientation at the center of spherical rotation.

SUMMARY OF THE INVENTION

The object of the invention is thus to provide a device for movement and orientation of an object in space comprising an object support carried by a movable intermediate support connected to a fixed frame by articulated connection means, and having characteristics suitable for use such as envisaged above and in particular in the case of high speed machining.

To this end, the device according to the invention comprises:

means for movement of the movable intermediate support relative to the fixed frame, maintaining the orientation of the intermediate movable support relative to the fixed frame and comprising actuators for movement in translation of an end portion of each of the articulated connection means carried by the fixed frame, and a mechanism for orientation of the object support relative to the movable intermediate support, comprising at least two assemblies for movement in rotation, each comprising a control axle mounted rotatably on the movable intermediate support and driven in rotation by an actuator for respective rotation, carried by the fixed frame and connected to the corresponding control axle by a transmission shaft mounted on cardan joints and a first curved arm secured, at a first end, to the corresponding control axle and connected in an articulated manner to the object support, at a second end, by at least one articulation axle, the control axles and the axes of articulation of the curved arms having orthogonal directions relative to each other and meeting at a point O constituting a point of spherical rotation.

According to different embodiments of the invention which can be taken together or in combination:

the movement device comprises at least two actuators for movement in translation, along at least two axes of a trirectangular trihedron, of end portions of at least two articulated connection means each comprising an articulated leg extending in a generally longitudinal direction between the fixed frame and the intermediate movable support;

the articulated leg comprises two bars in longitudinal direction extending in a longitudinal direction, forming with the end connection pieces an articulated parallelogram connecting a movable element of an actuator for translational movement and the intermediate movable support, in a manner such that the articulated parallelogram can deform in its plane and pivot about an axis contained in its plane to move in a direction normal to its plane;

the orientation mechanism comprises at least two assemblies for movement in rotation of the tool support relative to the intermediate support about at least two axes of the trirectangular trihedron;

the transmission shaft of each of the assemblies for movement in rotation is disposed between the bars of a corresponding articulated leg;

the means for movement of the intermediate movable support each comprise a first linear motor for movement in translation of an end portion of the articulated connection means carried by the fixed frame, the articulated connection means is in the form of a first articulated frame comprising two parallel bars, a first axle at the first end of the articulated connection means connected to a pushing and traction element moved by the linear motor by means of bearings mounted rotatably on the first axle, a second axle parallel to the first axle at the second end of the articulated connection means, a connection member of the mechanism for orientation at the articulated connection element connected to bearings mounted rotatably on the second axle in which is rotatably mounted a control axis for the orientation mechanism, a second linear motor carried by the fixed frame connected by means of articulation rods and to a second articulated parallelogram frame constituted by a bar substantially parallel to the bars of the first frame and two uprights connected to bearings mounted rotatably respectively on the first and second axles of the first frame of the articulated element, disposed in a position perpendicular to the first and to the second axles and parallel to each other and connected in an articulated manner to a first and to a second end of the bar of the second frame articulated as a parallelogram, the connection rods of the movable element of the second linear motor and of the second articulated frame being connected to the second articulated frame at a first end in prolongation of the first upright secured to the bearing mounted on the first axle and the bearing of rotatable mounting of the second upright on the second axle being secured to a toothed crown with conical teeth engaging with a conically toothed pinion secured to the control axle of the orientation mechanism, at the second end of the articulated element;

the first curved arm of a first assembly for movement is connected to the object support, at its second end, by an axle of articulation and the first curved arm of the second movement assembly of the device is connected in an articulated manner at its second end to a first end of an intermediate curved arm whose second end is connected in an articulated manner to the object support;

it comprises three assemblies for movement in rotation each comprising a control axle mounted rotatably on the movable intermediate support and driven in rotation by a respective actuator, a first curved arm secured to a first end of a respective control axle and a second intermediate curved arm articulated, at a first end, to a second and first curved arm and, at a second end, on the object support.

The device according to the invention can be used in particular:

to carry out movement of a tool in a rapid machining operation for complex shapes;

to carry out the movement of a laser torch in an operation for cutting complex shapes;

to carry out movement of a laser torch ensuring polymerization of a plastic material, in an operation of rapid production of a prototype;

to produce an interface of virtual reality, with or without haptic return.

A resilient coupling device can be disposed between a first and second cardan joints of the transmission shaft.

The transmission shaft can be connected at its second end, by a cardan joint, to a transmission rod connected, by means of a coupling socket, to the output shaft of a motor carried by the fixed frame, the coupling socket comprising internal longitudinal axial grooves and the transmission rod corresponding longitudinal channels, so as to ensure driving in rotation and free movement in translation of the transmission rod and of the transmission shaft connected to the rod by a cardan joint, during movements of the corresponding articulated leg.

BRIEF DESCRIPTION OF THE DRAWINGS

So as better to understand the invention, there will now be described, by way of example, with reference to the accompanying drawings, a device according to the invention and according to several modifications with four, five or six degrees of freedom.

FIG. 7 is a perspective view of an articulated leg according to a modified embodiment.

DETAILED DESCRIPTION OF EMBODIMENTS

Figure 1:
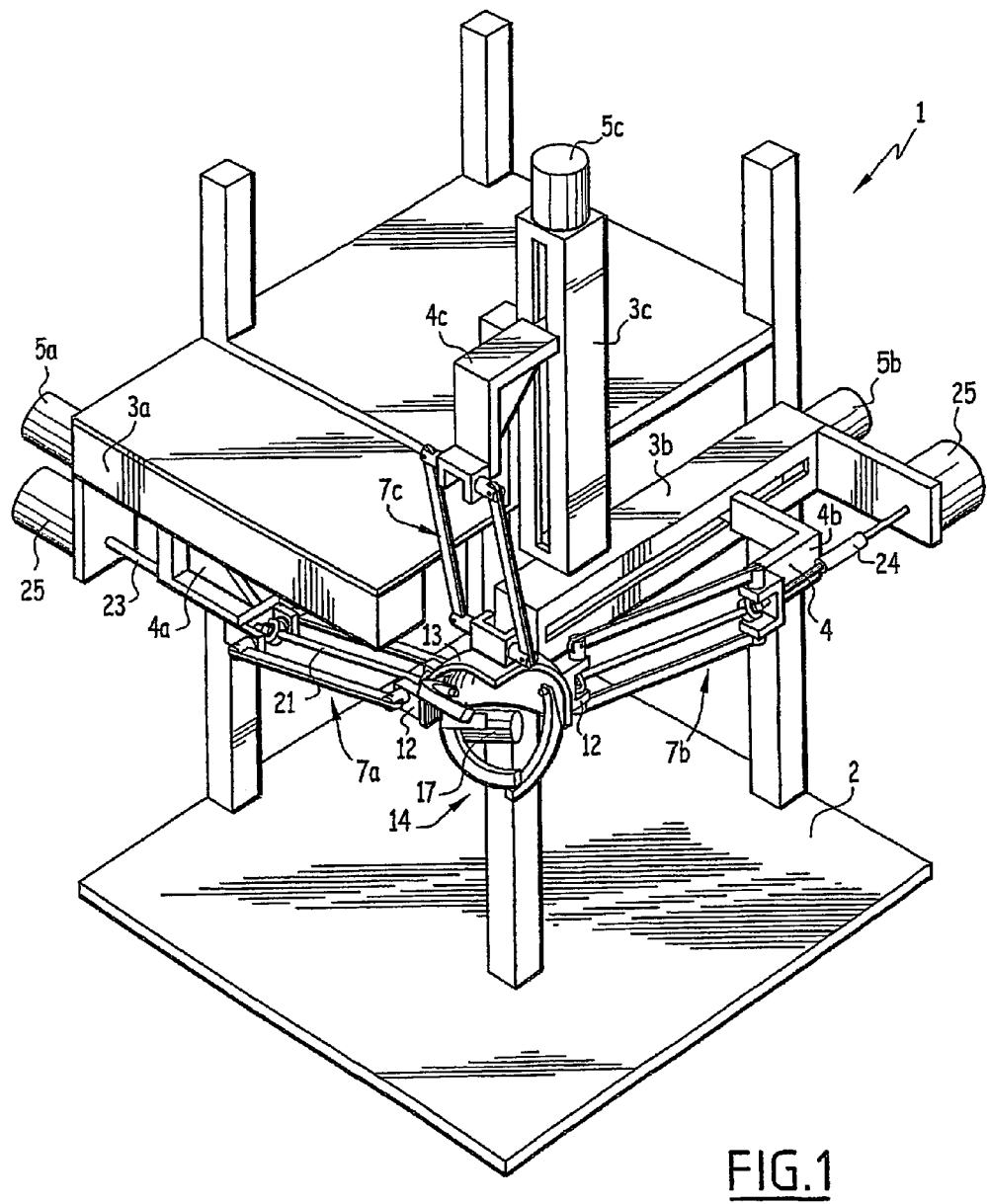
FIG. 1 is a perspective view of a device for movement according to the invention, with five degrees of freedom.

In FIG. 1, there is seen a device for movement and orientation according to the invention with five degrees of freedom along three axes of movement in translation and two axes in orientation.

The device generally designated by reference numeral 1 comprises a fixed frame 2 on which are fixed three slideways 3a, 3b and 3c whose longitudinal directions of guidance are disposed along three axes of a trirectangular trihedron.

On each of the slideways 3a, 3b, 3c, is movably mounted in the longitudinal direction of the slideway, a corresponding carriage 4a, 4b or 4c constituting the movable portion of a device for movement in translation along one of the axes of the trirectangular trihedron.

On each of the slideways 3a, 3b, 3c is fixed, at one of the ends of the slideway, a drive motor 5a, 5b or 5c which can be an electric motor associated with a position coder and with a braking system. The motor ensures driving in rotation of a screw mounted rotatably in the longitudinal direction of the slideway on which is mounted a nut with ballbearings secured to a connection member for the carriage introduced and guided into a longitudinal guide opening of the slideway. Between the drive motor and the ballbearing screw, can be interposed a resilient coupling permitting absorbing the shocks and limiting the couple transmitted in the case of blockage of the device. Each of the devices for movement in translation also comprises end of path detectors and electronic control means.

Figure 2:
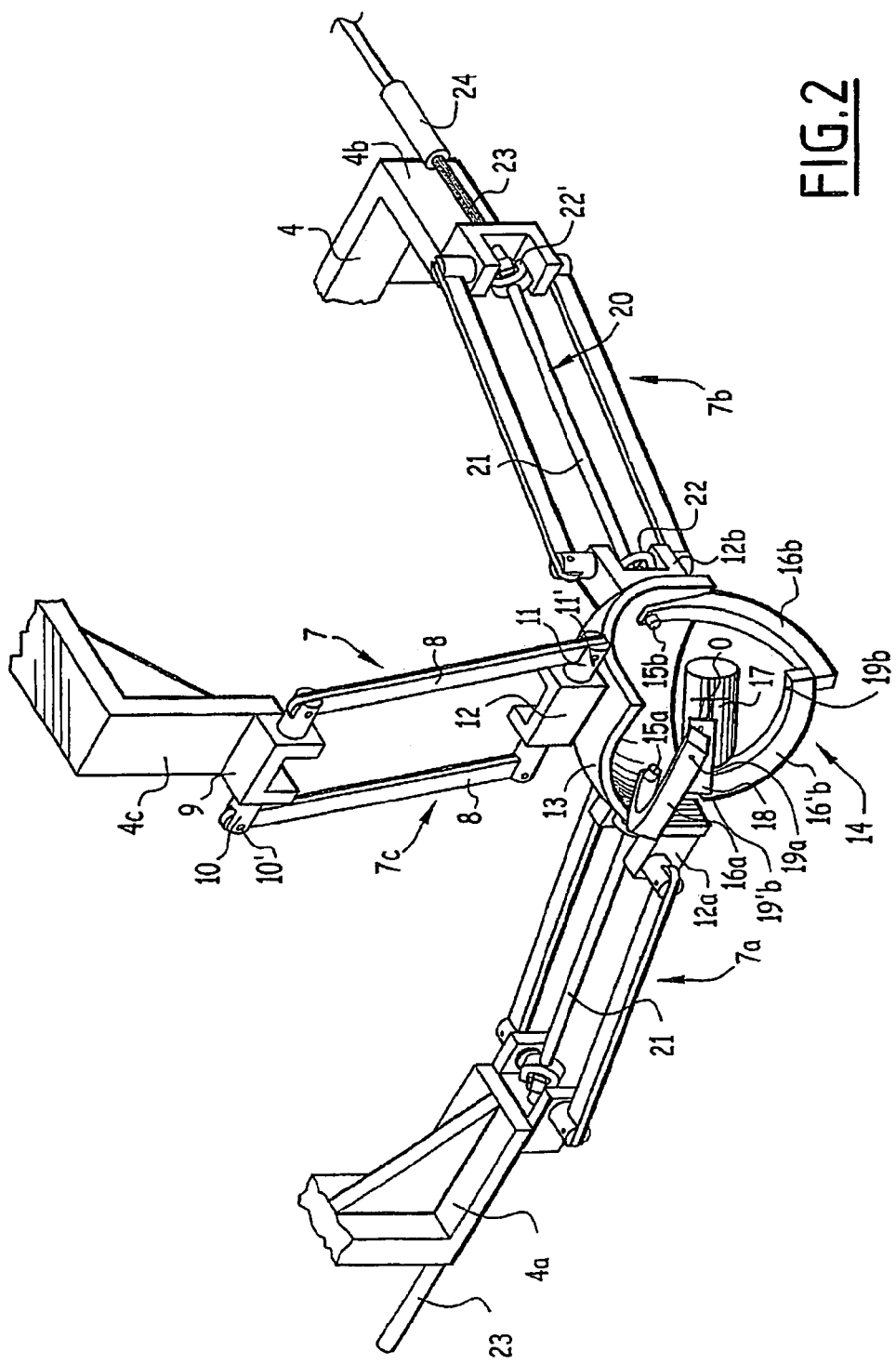
FIG. 2 is a perspective view on a larger scale of the functional portion of the device.

As can be seen particularly in FIG. 2, each of the carriages 4a, 4b and 4c is connected, by means of a connection member, to an articulated leg in the form of a parallelogram which will be designated generally by the reference numeral 7 and by reference to the three articulated legs connected to the carriages 4a, 4b and 4c by reference numerals 7a, 7b and 7c.

Only one of the articulated legs will be described, generically, the three legs 7a, 7b and 7c being made in the same way.

The articulated leg 7 comprises two bars 8 parallel to each other disposed in the longitudinal direction of the leg 7 and each connected, at a first end, to a connection member 9 to the corresponding carriage of the device for movement in translation, by means of a first axle 10 and a second axle 10' perpendicular to each other. The axle 10 is mounted rotatably in the connection member 9 and the axle 10' ensures the articulated connection between the end of the bar 8 and the axle 10.

The second end of the bars 8 is mounted articulatedly analogously on the support of the orientation mechanism 12, by means of two axles 11 and 11' perpendicular to each other and disposed in series.

In this way, when the ends of the articulated bars comprising the connection members 8 to the carriages are moved, by means of the carriages, the legs 7 constituted in the form of articulated parallelograms can pivot relative to the connection member 9 and relative to the support of the orientation mechanism 12 and can deform as a parallelogram, the bars 8 connected to the axles 10 and 11 remaining parallel to each other.

The support means for the mechanism 12 of each of the articulated legs 7a, 7b, 7c is fixed rigidly secured on an intermediate movable support 13 of a mechanism 14 for orientation of the device along two axes.

The orientation mechanism 14 and its control means in rotation will be described in particular with reference to FIGS. 2 to 4.

The movable intermediate support of mechanism 13 has preferably a substantially hemispherical shape, the support means 12 of each of the articulated legs being fixed rigidly, for example by screwing on the intermediate movable support 13 in the form of a hemispherical envelope, in positions corresponding substantially to the intersections of the hemispherical envelope with the axes of a trirectangular trihedron whose center is located at the center of the hemispherical envelope.

The two axes of rotation of the orientation mechanism 14 are controlled from two articulated legs 7a and 7b whose support means 12a and 12b are rigidly secured to the movable intermediate support of mechanism 13 and each comprise a bearing ensuring the rotatable mounting of a first axle 15a and a second axle 15b which are directed to a point O which constitutes the center of rotation of the orientation means 14 constituted in the form of a spherical joint.

On the axles 15a and 15b are fixed respectively a first curved arm 16a and a second curved arm 16b secured in rotation with the respective axles 15a and 15b.

The curved arms 16a and 16b have the shape of portions of a ring whose radius is a bit smaller than the radius of the spherical envelope of the intermediate support 13, such that the assembly of the mechanism can be disposed within the envelope of the intermediate movable support 13 for the mechanism.

Figure 4:
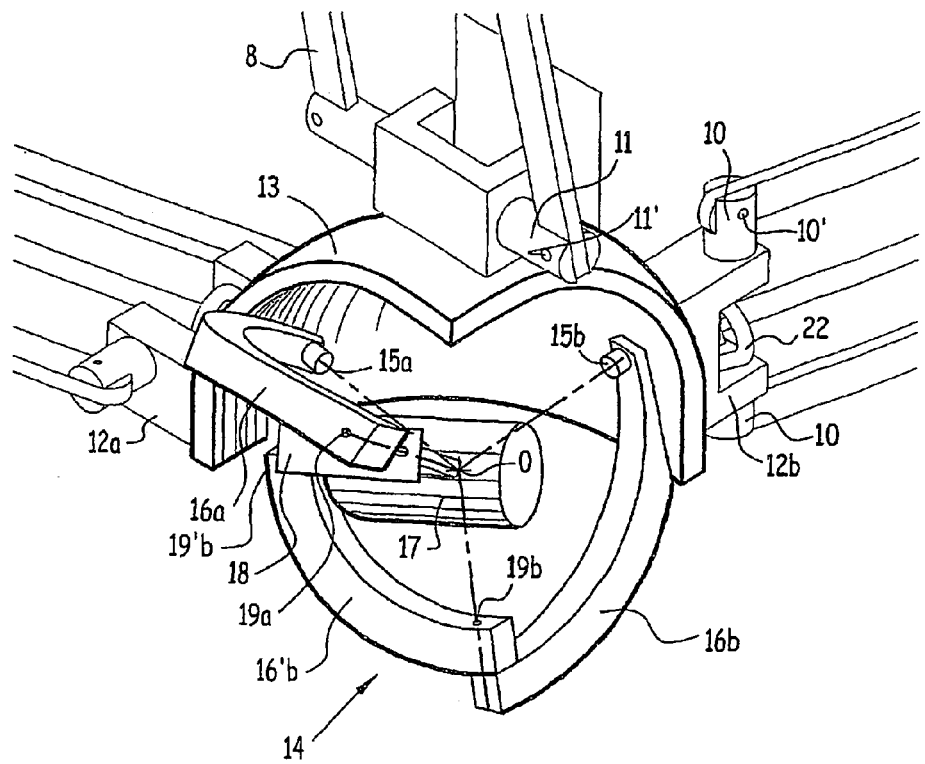
FIG. 4 is a perspective view on a larger scale of the spherical orientation mechanism of the device and of its connection means to the three articulated legs.

The object whose orientation and movement is to be ensured, which can for example be a tool such as a milling tool, which is shown in a conventional manner in FIGS. 2 and 4 and is designated by reference numeral 17, is fixed rigidly secured to an object support 18 by suitable securement means.

The first arm 16a of the orientation mechanism is fixed in articulated manner about an axis of articulation 19a passing through the center of spherical rotation O of the mechanism, on the object support 18, at its end opposite the end connected to the rotational axle 15a.

The second arm 16b of the orientation mechanism 14 is connected, in an articulated manner, by means of an axle 19b, to an intermediate arm 16'b which is itself mounted articulatedly about an axis 19'b on the object support 18. The axles 19a, 19b and the axis 19'b of articulation of the arms 16a, 16b, 16'b are orthogonal and directed toward the center of spherical symmetry O of the device 13.

The rotation of the first arm 16a and of the second arm 16b is controlled by an assembly for movement in respective rotation designated generally by the reference numeral 20.

Because the assemblies for control of rotation of the arms 16a and 16b are similar, there will be described but one of the control assemblies, designated generally by the reference numeral 20 and associated with one of the articulated legs 7.

The assembly 20 comprises a transmission shaft or actuating rod 21 mounted between the bars 8 of the articulated leg 7 in an arrangement parallel to the bars 8 and connected at first and second ends, respectively, by means of first and second articulations to the respective cardan joints 22 and 22' to the axis of the corresponding arm (15a or 15b) at the support means of the mechanism 12 of the articulated leg and to a transmission rod 23, at the connection member 9 between the corresponding carriage 4 and the articulated leg, in which the transmission rod 23 is mounted rotably by means of a bearing.

The cardan joints 22 and 22' are disposed respectively between the axles 10 and between the axles 11 aligned along the geometric axes of pivoting of the articulated leg 7.

The transmission rod 23 is itself connected, by means of a coupling socket 24, to the output shaft of a motor 25 fixed on a support secured to the slideway 3 of the articulated arm and of the fixed frame 2. The coupling socket 24 comprises longitudinal internal grooves and the transmission rod 23 has itself channels corresponding to the grooves of the coupling socket 24, so as to ensure coupling in rotation of the output shaft of the motor 25 and the transmission rod 23, with freedom of movement in translation of the rod 23 relative to the socket 24 and to the fixed frame 2, to permit movements of the leg 7, during movements in translation of the carriage 4 along the slideway 3.

The movement of rotation can also be transmitted to the arms 16*a* and 16*b* of the orientation mechanism, no matter what the position of the mechanism in space, this position being determined by the movement of the articulated arms 7*a*, 7*b* and 7*c*.

Moreover, the presence of the cardan joints 22 and 22' permits transmitting the movement in rotation to the axle and to the arm of the mechanism, no matter what the misalignment of the articulated leg 7 relative to the output shaft of the motor 25.

Figure 3:
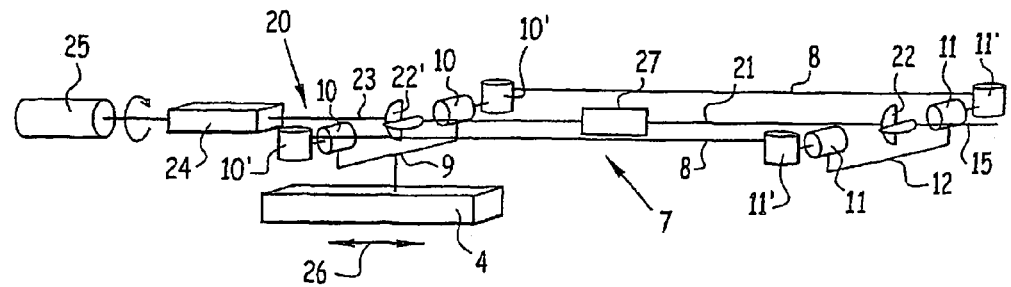
FIG. 3 is a schematic view of an articulated leg of the device with three articulated legs shown in FIG. 1.

In FIG. 3, there is shown schematically an articulated leg of the device with five degrees of freedom as shown in FIGS. 1, 2 and 4 and the control assembly in rotation 20 of the device for spherical orientation connected to the articulated leg 7.

The carriage 4 for movement in translation (movement shown by the double arrow 26) of one end of the articulated leg 7 is connected by means of the connection member 9 to the two rods 8, by means of articulation axles 10 and 10' disposed in series.

At their opposite ends, the bars 8 are connected to the support means of the orientation mechanism 12 of the articulated leg 7, by means of articulation axles 11 and 11' disposed in series. The actuating rod 21 disposed between the bars 8 is connected by cardan joints 22 and 22', respectively, to one of the axles 15 of the orientation device and to the transmission rod 23. The transmission rod 23 is itself secured in rotation with the output shaft of the motor 25 and mounted freely in translation, by means of the coupling socket 24.

Preferably, a resilient coupling device 27 disposed between the cardan joints 22 and 22' of the actuating rod 21 permits compensating the mounting play and tolerances of manufacture of the device.

The device according to the invention, in its embodiment with five axes as described above, permits providing movement in space of a tool 17 in a manner which can be perfectly controlled by the control means of the motors 5*a*, 5*b* and 5*c* of the three articulated legs and an orientation of the tool along two axes thanks to the spherical orientation mechanism 14. It is to be noted that the movements in translation of the tool 17 and the regulation of orientation of the tool, can be carried out in a manner totally independent from each other, the orientation being effected by control assemblies of rotation 20 of two articulated legs, by means of motors 25 controlled in a manner totally independent of the motors 5*a*, 5*b* and 5*c* for movement in translation, the orientation in space of the mechanism 14, which is to say its movable intermediate support 13 remaining constant during movements in translation of the tool controlled by the three articulated legs.

There can thus be carried out rapid and perfectly controlled machining of the workpiece, for example milling of a piece of complex shape.

The surface envelope of the movements of the device is perfectly defined and the speeds of movement of the tool can be controlled in a precise manner throughout the space of movement of the tool.

Generally, to carry out a rapid machining operation such as milling, a device for movement and orientation with five axes is sufficient. However, in certain cases, it can be desirable to have a device for movement and orientation with six degrees of freedom to add redundancy to the orientation adjustment.

Figure 5:
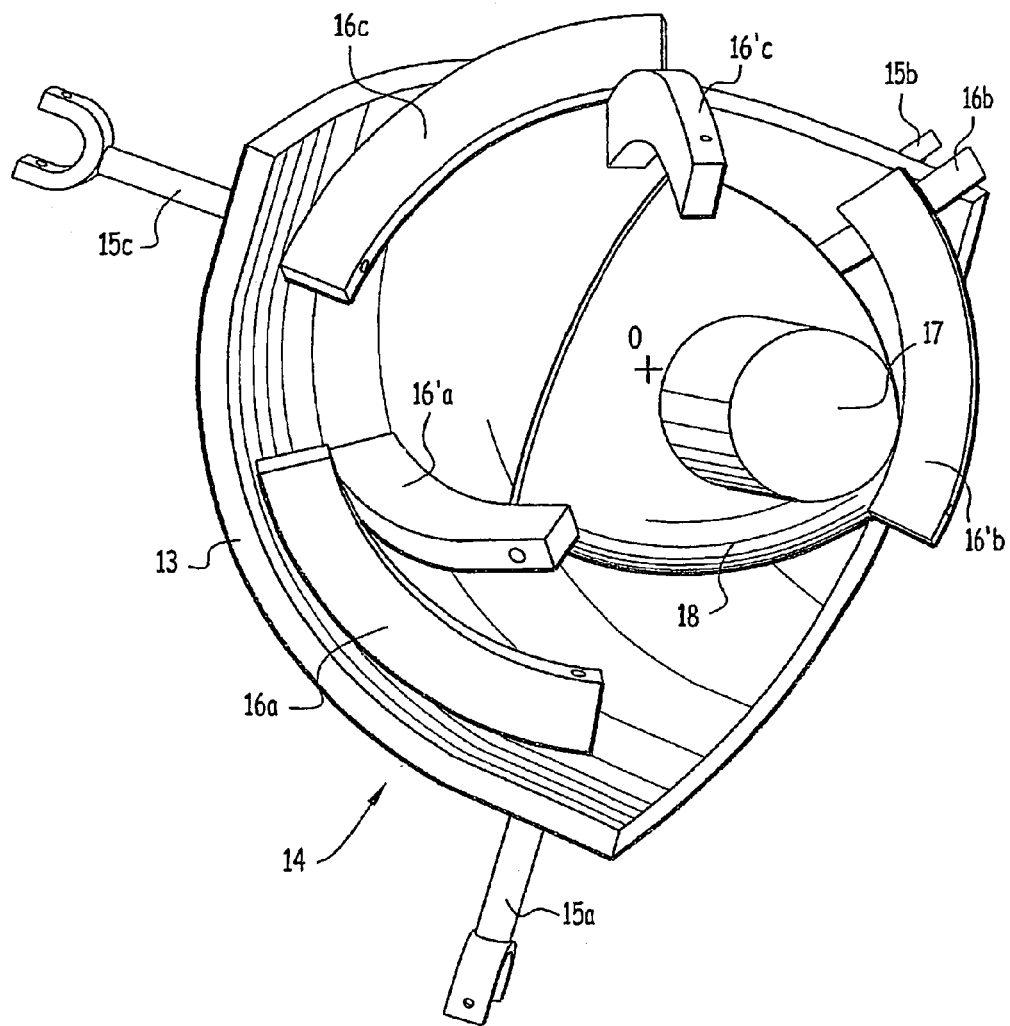
FIG. 5 is a perspective view of a mechanism for spherical orientation of a device according to the invention with three axes.

In this case, there is used an orientation mechanism 14 with three degrees of freedom such as shown in FIG. 5.

An orientation mechanism with three degrees of freedom as shown in FIG. 5 comprises a first arm 16*a*, second arm 16*b* and a third arm 16*c* which can be connected analogously to the arms 16*a* and 16*b* of the embodiment with five degrees of freedom described above. Each of the arms 16*a*, 16*b* and 16*c* of the orientation mechanism 14 is secured to a respective rotational axle 15*a*, 15*b*, 15*c* adapted to be connected by cardan joint coupling to a respective actuating rod of a mechanism for controlling in rotation associated respectively with the articulated leg 7*a*, 7*b* or 7*c*. In this case, an assembly for control in rotation 20 is associated with each of the three articulated legs of the movement device.

Each of the arms 16*a*, 16*b*, 16*c* of the orientation mechanism 14 is connected to a first end of a respective intermediate arm 16'*a*, 16'*b*, 16'*c* by means of a respective articulation axle.

The second ends of the intermediate arms 16'*a*, 16'*b*, 16'*c* are connected in an articulated manner, by means of three respective axles, on the object support 18.

The assembly of the control axles 15*a*, 15*b*, 15*c* and of the articulation axles of the intermediate arms on the first, second and third arms and on the object support 18 orthogonal to each other pass through a center of spherical orientation O of the orientation device.

In certain cases, it is not necessary to use a device with five degrees of freedom, two axes of movement in translation being sufficient to move the orientation mechanism carrying the tool in one plane, for example in a horizontal plane.

Figure 6:
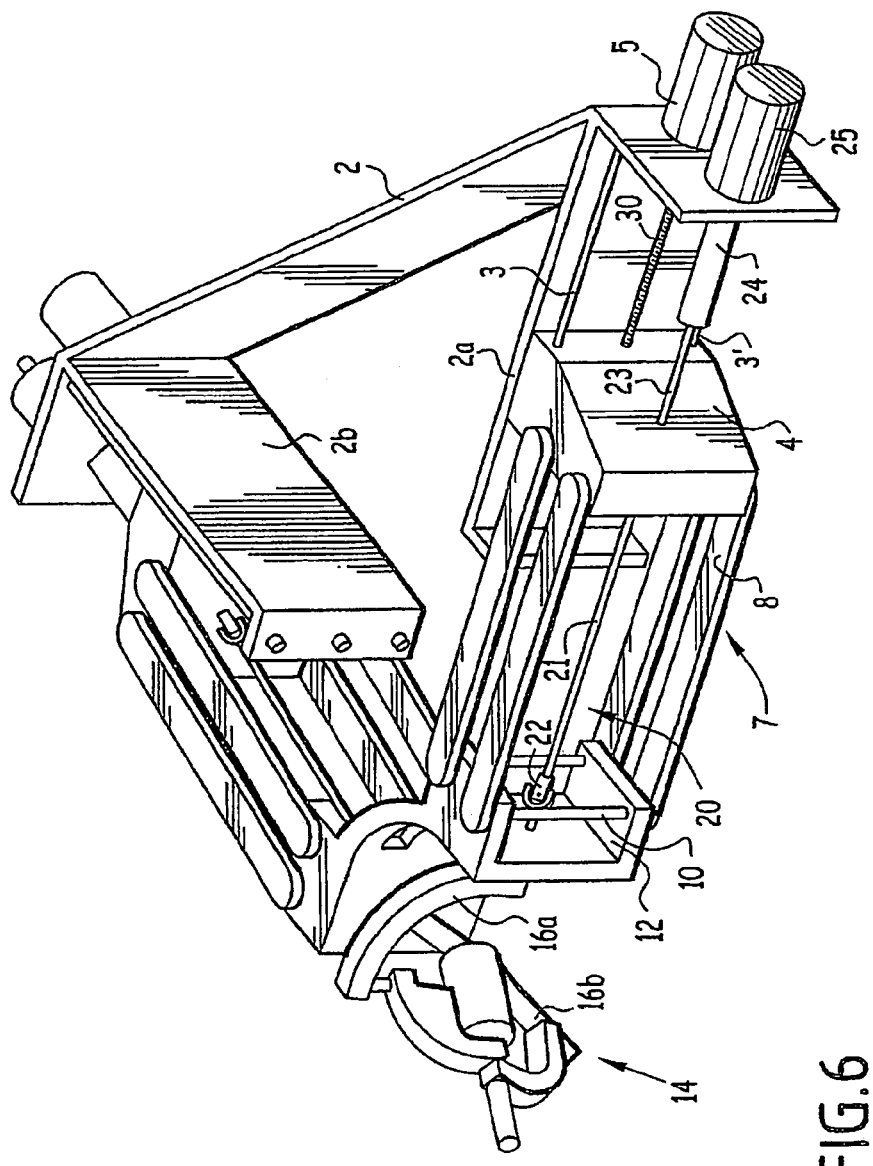
FIG. 6 is a perspective view of a device for movement according to the invention with four degrees of freedom.

In FIG. 6, there is shown such a device for movement and orientation with four degrees of freedom which is mounted on a fixed frame 2 comprising two uprights 2*a* and 2*b* in arrangements substantially perpendicular to each other.

Each of the frame elements 2*a* and 2*b* carries two guard bars 3 and 3' fulfilling the role of slideways for a carriage 4 driven in translation along slideways 3 and 3' by a screw 30 driven in rotation by a motor 5 carried by the frame 2 coacting with a nut with ballbearings of the carriage 4 moving along the slideways 3, when the screw 30 is driven in rotation by a motor 5 carried by the frame 2.

The carriage 4 ensures the movement in translation of one end of an articulated leg 7 which can be constituted for example, as shown in FIG. 6, by four bars 8 disposed in directions of the edges of a parallelepipedal and connected to the carriage 4 and to a support 12 of orientation mechanism 8, by means of axles 10 which are all parallel to each other.

The supports 12 of the orientation mechanism are connected, in a rigid manner, to a movable intermediate support of a mechanism 14 which can for example by in the form of a mechanism for orientation with two axes, as described above.

Each of the articulated arms mounted on the frame element 2*a* or 2*b* comprises an assembly for control in rotation of the first arm 16*a* and the second arm 16*b* of the orientation mechanism 14. Each of the rotational control assemblies 20 comprises an actuating rod 21 mounted within the articulated leg in an arrangement parallel to the bars and connected by cardan joints such as 22, on the one hand, to a rotational axle secured to an arm 16*a* or 16*b* and, on the other hand, to a transmission rod 23 secured in rotation by means of a socket 24 of the output shaft of a motor 25 carried by the frame 2, the socket 24 permitting movement in translation of the transmission rod 23 relative to the frame 2 during movements in translation of the corresponding articulated leg whilst ensuring the transmission of the rotation between the output shaft of the motor 25 and the transmission rod 23 connected to the actuating rod 21 for rotating the control axle of an arm of the orientation mechanism 14.

In FIG. 7, there is shown an articulated leg 7 of a device for movement and orientation according to the invention which can be substituted for the articulated leg such as 7a, 7b or 7c of a device as described above and which is made according to an embodiment different from the modes described above.

The leg 7 uses for its movement in translation a first linear motor 31 which is fixed on the fixed support 2 of the device and a second linear motor 32 to ensure rotation about an axis 40 of an orientation mechanism, which can be similar to the orientation mechanism 14 shown in FIGS. 1 to 6.

The linear motor 31 ensures the movement in translation in one direction or the other, as indicated by the double arrow 36, of the articulated leg 7, by means of a push or pull member 35 driven in translation by the linear motor 31.

At its second end, the articulated leg 7 is connected to the movable support 13 of the orientation mechanism 14 at the center of spherical orientation, by means of the member 38 constituting the equivalent of the orientation support mechanism 12 described above.

The articulated leg 7 is in the form of a frame comprising two parallel rods 33a and 33b between which are mounted, at the ends of uprights, a first axle 34a and a second axle 34b parallel to each other and fixed to the rods 33a and 33b at the corners of the frame 33.

On the first axle 34a are mounted two rotatable bearings 37a and 37b by means of which the frame 33 is connected to the push and pull member 35 transmitting movements of the linear motor 31.

On the second axle 34b are mounted two rotatable bearings 39a and 39b by means of which the orientation mechanism support 38a is connected to the frame 33.

The movable portion of the linear motor 32 is connected, by means of universal connections 44' and 45' and rods 44 and 45, to a bearing 41' mounted at the end of a bar 41 of an assembly for movement in rotation of the axle 40, by the linear motor 32. The bar 41 is connected by a bearing 41' to an upright comprising a rod 42 and a bearing 42", to a bearing 42' mounted rotatably on the axle 34a between the bearings 37a and 37b.

At its second longitudinal end, the bar 41 of the device for rotating the axle 40 is connected in an articulated manner by a second bearing 41" to an upright comprising a bearing 43" and a rod 43 connected to a bearing 43' mounted rotatably on the second axle 34b.

The bearing 43' is secured to a conical toothed crown 46 engaging with a conical pinion 47 wedged on the shaft 40 mounted rotatably in the support 38 by means of a bearing 40'.

As is seen in FIG. 7, the movements in translation of the leg 7 in its assembly (and hence of the orientation mechanism 14) are obtained by the linear motor 31.

The movement in rotation of the axle 40 connected to a curved arm of the orientation mechanism 14 is obtained by the linear motor 32 which, by means of the rod 44 and the cardan joints 44' and 45', drives in rotation about the axis of the bearing 42' and of the first shaft 34a, the rods 45 and 42. The assembly constituted by the first upright comprising the rod 42 and the connecting bearing 42", the bar 41 and the second upright comprising the rod 43' and the connection bearing 43", constitutes an articulated parallelogram which deforms when the movable portion of the linear motor 32 moves in one direction or the other, as shown by the double arrow 46. The bearing 43' and the conical toothed wheel 46 are rotated about the axis of the bearing 43' and of the second axle 34b, which rotates the conical pinion 47 and the axle 40 of the orientation mechanism 14 with a spherical center. An amplification of the rotation can be obtained by providing a number of teeth on the wheel 46 and the pinion 47 in a certain ratio.

There are thus obtained all the desired movements for an articulated leg, from two linear motors mounted on the fixed support 2 of the device.

Of course, there can be used, for example in the case of an embodiment analogous to the embodiment shown in FIGS. 1 and 2, two legs articulated analogously to the articulated leg shown in FIG. 7 and a third articulated leg such as the leg 7c shown in FIG. 1 or as shown in FIG. 7 limited to the frame 33, to the linear motor 31 and to the connection members 35 and 38.

In the case of all embodiments, the device for movement and orientation according to the invention has a perfectly isotropic configuration. Because of this, this device for movement and orientation can be adapted to numerous types of machining. Moreover, the members for controlling position (the articulated legs) and orientation (the orientation mechanism) are completely decoupled. The device can thus be provided from modular elements. Moreover, the powers of the motors used can be suitable according to the type of application, for each of the control members as to position and orientation, which is not possible for example in the case of parallel architecture of the "Gough-Stewart" type in which all the motors must have the same power.

Because of these characteristics, the device according to the invention can be applied in particular to machining requiring the provision of trajectories of complex shapes at high speeds, for example for operations of rapid prototyping or again for operations of manipulation of the "pick and place" type. Moreover, the properties of isotropy and of regular working space, well defined by the device, permit using it as a force return mechanism, in the framework of an application of restitution of a virtual reality interface with or without haptic return (that is to say with or without creation of a sensation of contact for the user). For example, the device can be used for detection of contacts or shocks in the case of machining and of rapid manipulations.

In the case of rapid prototype operations, the device according to the invention can be used in particular to move a laser torch ensuring cutting out of complex shapes or else the polymerization of a plastic material for the production of a complex piece.

The invention claimed is:

1. A device for movement and orientation of an object in space comprising:
    a fixed frame;
    a plurality of articulated connectors;
    a movable intermediate support connected to said fixed frame by said articulated connectors;
    an object support carried by said movable intermediate support;
    means for movement of the movable intermediate support relative to the fixed frame that maintains an orientation of the movable intermediate support relative to the fixed frame and comprises actuators for translation, along an axis, of an end portion of each of the articulated connectors carried by the fixed frame; and
    a parallel mechanism being configured for orientation of the object support relative to the movable intermediate support and comprising at least two assemblies for movement in rotation, each of the assemblies comprising:

a control axle mounted rotatably on the movable intermediate support, a rotation actuator carried by the fixed frame, said control axle is driven in rotation by a respective said rotation actuator which is connected to the corresponding control axle by a transmission shaft mounted on cardan joints, and a first curved arm secured, at a first end, to the corresponding control axle and connected in an articulated manner to the object support at a second end, about at least one articulation axis, the control axle of each of the assemblies and the axis of articulation of each of said first curved arms having directions orthogonal to each other and intersecting in a point constituting a point of spherical rotation.

2. The device according to claim 1, wherein at least two of said actuators for movement in translation, along at least two axes of a trirectangular trihedran, of end portions of at least two of said articulated connectors each comprise an articulated leg extending in a longitudinal direction between the fixed frame and the intermediate movable support.

3. The device according to claim 2, wherein the articulated leg comprises two bars extending in the longitudinal direction forming with end connection members, an articulated parallelogram connecting a movable element of one of said actuators for movement in translation and the intermediate movable support, such that the articulated parallelogram deforms in a plane of said articulated parallelogram and pivots about an axis contained in the plane of the articulated parallelogram to move in a direction normal to the plane of the articulated parallelogram.

4. The device according to claim 3, wherein the transmission shaft of each of the assemblies for movement in rotation is disposed between the bars of a corresponding articulated leg.

5. The device according to claim 1, wherein the means for movement of the intermediate movable support each comprise:

a first linear motor for movement in translation of the end portion of each of the articulated connectors carried by the fixed frame, each of the articulated connectors is in the form of a first articulated frame comprising:

two parallel bars, a first axle at the first end of the articulated connector is connected to a push and pull element moved by the first linear motor by means of bearings mounted rotatably on the first axle, a second axle parallel to the first axle at the second end of the articulated connector, a member for connection of the parallel mechanism to the articulated connector connected to bearings mounted rotatably on the second axle in which is rotatably mounted a control axle of the parallel mechanism, a second articulated parallelogram frame constituted by a bar substantially parallel to the bars of the first frame and two uprights connected to bearings mounted rotatably respectively on the first and the second axles of the first frame of the articulated connector, said two uprights are disposed in an arrangement perpendicular to the first and to the second axles and are parallel to each other and are connected in an articulated manner to first and second ends of the bar of the second articulated parallelogram frame, a second linear motor carried by the fixed frame and connected by means of articulation rods to said second articulated parallelogram frame, the articulation rods being connected to the second articulated parallelogram frame at a first end in prolongation of the first upright secured to the bearing mounted on the first axle and the rotatable mounting bearing of the second upright on the second axle being secured to a toothed crown with conical teeth engaging with a pinion with conical teeth secured to the control axle of the parallel mechanism, at the second end of the articulated connector.

6. The device according to claim 1, wherein the first curved arm of one of the assemblies for movement is connected to the object support, at the second end, by an articulation axle and the first curved arm of another of the assemblies for movement is connected articulatedly at a second arm to a first end of an intermediate curved arm, a second end of said intermediate curved arm is connected in articulated manner to the object support.

7. The device according to claim 1, wherein said at least two assemblies comprise three assemblies for movement in rotation each comprising the control axle mounted rotatably on the intermediate movable support and driven in rotation by a respective actuator, the first curved arm secured to the first end of a respective control axle and a second intermediate curved arm articulated at a first end to the second end of the first curved arm and at a second end to the object support.

8. The device according to claim 1, structured and arranged to produce movement of a tool in a rapid machining operation of complex shapes.

9. The device according to claim 1, structured and arranged to carry out the movement of a laser torch in an operation of cutting out complex shapes.

10. The device according to claim 1, structured and arranged to carry out the movement of a laser torch ensuring the polymerization of a plastic material, in an operation for rapid production of a prototype.

11. The device according to claim 1, structured and arranged to produce an interface of virtual reality, with or without haptic return.

* * * * *